United States Patent [19]
Hanemaayer

[11] Patent Number: 5,788,320
[45] Date of Patent: Aug. 4, 1998

[54] HIDDEN INSTALLATION OF A WATER HEATER, GENERATOR AND BATTERY UNDER THE FLOOR AT THE REAR OF A VAN

[76] Inventor: Jacobus N. Hanemaayer, 100 Shirley Avenue, Kitchener, Ontario, Canada, N2B 2E1

[21] Appl. No.: 699,908

[22] Filed: Aug. 20, 1996

[51] Int. Cl.⁶ ............................................. B60P 3/345
[52] U.S. Cl. ............................................. 296/164
[58] Field of Search ................... 296/24.1, 25, 26, 296/37.1, 156, 157, 164, 165, 167, 172; 62/89, 200, 239

[56] References Cited

U.S. PATENT DOCUMENTS

| | | | |
|---|---|---|---|
| 3,868,060 | 2/1975 | Mitchell | 296/164 |
| 3,959,985 | 6/1976 | Schulze, Sr. | 296/156 |
| 3,986,492 | 10/1976 | White | 296/156 |
| 4,106,582 | 8/1978 | De Bella | 296/164 |

Primary Examiner—Jesus D. Sotelo
Attorney, Agent, or Firm—Killworth, Gottman, Hagan & Schaeff, L.L.P.

[57] ABSTRACT

A recreational vehicle (RV) having a water heater, generator and battery hidden from view under the floor at the rear of a camper van.

16 Claims, 8 Drawing Sheets

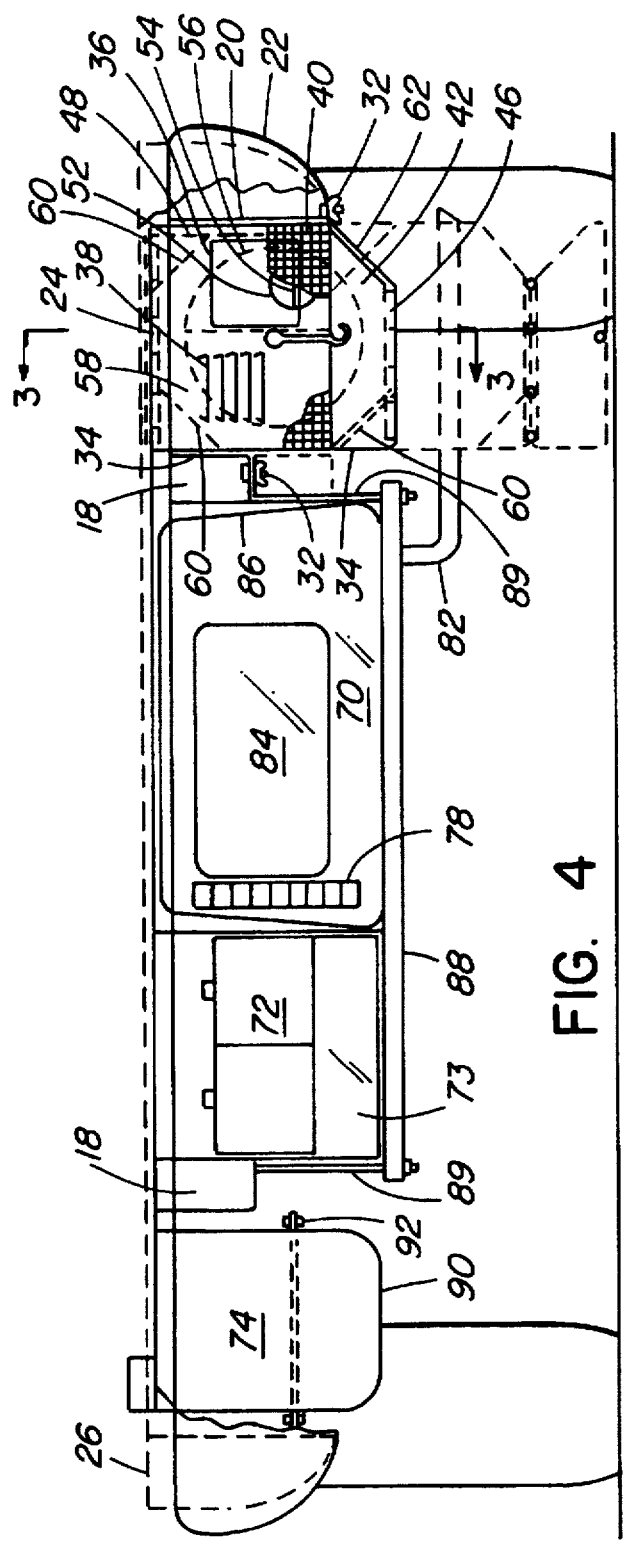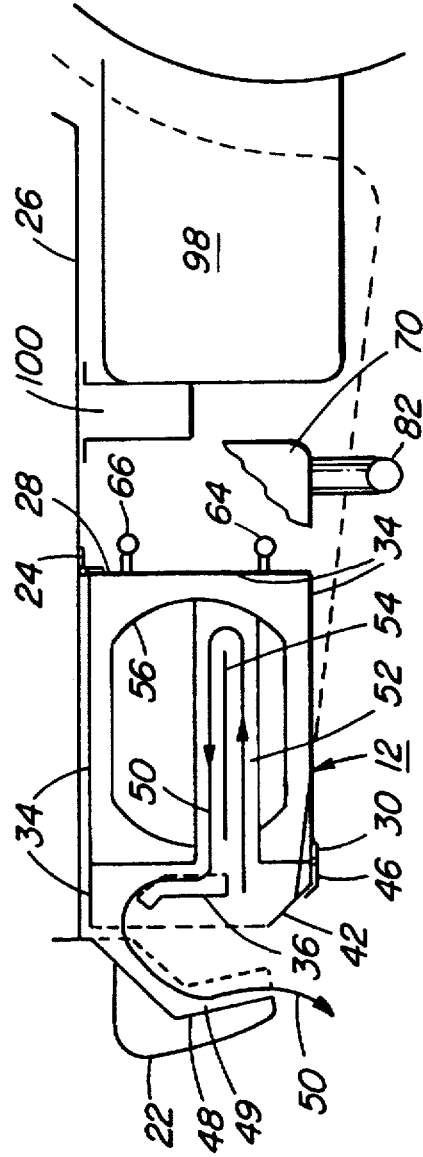

HIDDEN INSTALLATION OF A WATER HEATER, GENERATOR AND BATTERY UNDER THE FLOOR AT THE REAR OF A VAN

BACKGROUND AND SUMMARY OF INVENTION

This invention relates to recreational vehicles (RV's) and, in particular, to the hidden installation of certain bulky equipment, particularly, a water heater, generator and battery (s) under the floor at the rear of a camper van.

Normally, the above-noted equipment is installed in camper vans above the floor, terminating, as required by law, anywhere possible through the exterior wall of such a vehicle. This is not only unattractive in exterior appearance, but this bulky equipment also reduces the much needed limited storage space above the floor of a small van, as in a "Class B" motor home (a well known and accepted term in the industry). Unlike the larger, straight sided and somewhat box-shaped RV's, which can have, for instance, a conventional water heater installed at one side under the floor, such is not possible with a small van of the type under consideration, due to the extreme inward curve of the exterior surface below the floor level. Also, the distance between the chassis rail and the surface of the exterior wall is not sufficient to accommodate such a heater. Even if the water heater is installed above the floor of a van, it makes a poor fit at best, as the water heater exterior end (frame and door) is straight (designed to fit against straight vertical walls), but the exterior wall above the floor of all van makes is outwardly curved as well, although not as extremely curved as below the floor. To make matters worse, all van brands have differing exterior wall curves and projecting ridges (lines) at different heights; hence there is no suitably fitting water heater on the market. Furthermore, since it is a liquid propane-fired heater, for safety requirements it must terminate directly at the exterior wall, not spaced back from it.

An installation, according to the present invention, meets the safety regulations, is hidden from view, and saves valuable interior storage space above the floor by instead using under-floor space previously wasted (as that space is practically not accessible from inside or out, or normally not even worth the expense to make it accessible). A curved outside access door would be too expensive for the space gained, and besides, it would make the exterior less attractive.

Unlike most of the larger RV's, including the camper vans of our competitors, Applicant's camper vans (sold under the trademark "Roadtrek") have most of the valves, caps, plugs, fills, connections, vents, grills and accesses hidden from view and safe from tampering. Most other RV's have numerous surface interruptions since the above items are mostly on the exterior and require separate locks for each item to prevent tampering, which is very inconvenient. In contrast, in Applicant's "Roadtrek" RV's, the water fill is just above the step, on the inside of the passenger door, and the city water connection and the 110 volt electric cable connection are inside the locked running board storage space. A large threaded plug in the floor of this storage space gives access to the water hose and electric cable connections. There is also an exterior hand-held showerhead and valves to drain the hot and cold water lines, aligned above the plug opening in the floor of this running board storage space. The liquid propane, fill and shut-off valve, sewer discharge hose, cap and pull valves are hidden behind and under the driver side running board door step and are accessible by simply lifting the latched step. The lower vent of the refrigerator is hidden from view in the floor, and the upper vent is disguised in the bottom half of a window above, in the form of inconspicuous louvre slats. On some models, the vents of the black and grey waste water holding tanks exit in the space behind the refrigerator, which is vented directly to the outside. In some cases, we vent the furnace exhaust in the rear wheel well, which is thus hidden from view. Our air conditioner (AC) unit is built-in, (as opposed to the usual rooftop by others, which is very detrimental to the appearance of any RV, especially a van of our type) and it has a very attractive appearance.

The foregoing are some of the reasons our "Roadtrek" RV is and has been the number one selling North American built Class B motor home for several years in a row now. The foregoing recitation of features should also enable persons in this art to appreciate the merits of hiding the unattractive grill and service access covers of the water heater and generator, etc. from view, by placing them at the rear below the floor and forwardly of the rear bumper in accordance with the invention.

As mentioned earlier, the objects of the invention are to make better use of the limited space above the floor of the camper van interior for easy accessible storage and other uses, and also to improve the exterior appearance by locating the water heater forwardly of the rear bumper and under the floor, and yet having it readily accessible for service.

Accordingly, the invention in one aspect provides a class B motor home comprising a commercial cargo van when converted to a recreational vehicle, said vehicle having a body including a floor and a rear bumper and a water heater having a burner therein suspended below said floor at the rear of said vehicle and forwardly of the rear bumper thereof, said water heater having a vent therein for releasing burner exhaust fumes rearwardly of the vehicle.

In a preferred form of the invention, the heater is hinged at the inward end to the bottom of the camper van floor and releasably-strapped at the outward end for lowering, when required, so that it is completely exposed for service. It is, however, also serviceable without lowering it, by simply releasing and lowering a door which covers approximately the lower quarter of the water heater face. The door is installed on a forty-five degree inward angle below the rear bumper, so that it is hidden from view from a person standing up a normal viewing distance away. The door is hinged across the bottom of the heater. When opened, the burner nozzle, valves, etc. are then accessible for service. A readily removable protective screen is located immediately above the door. Preferably, the outward end of the heater is held up by a metal strap secured by wing nuts (for easy release) to bolts protruding from the vehicle body. A heat shield deflector forwardly of the bumper directs the exhaust fumes downwards and sideways for dissipation into the air.

Another feature of the invention concerns the generator and battery per se, which have been relocated (like the water heater) from a position above the floor, to a position below it, freeing up readily accessible above-floor space, hence making use of previously unused space beneath the floor. When installed above the floor, as in the past, these items need special metal-lined compartments sealed for fumes and vented to the exterior with service doors, which is a disadvantage we want to get rid of, both to improve the exterior appearance and to save the cost to make and install these doors and the venting. By suspending this equipment in the open air below the floor, a short distance in from the rear of the vehicle body and forwardly of the rear bumper, they are then not only hidden from view but are also readily serviceable. There is no need to build sealed and metal-lined compartments with service doors and venting provisions; venting is automatic as these items are in the open air. Batteries have been installed, in the past, on the sides of vans, below the floor, behind service doors. They cannot be installed a certain distance in from the sides for service, due to the proximity of the chassis rails and, therefore, they require a service door for access. As said before, both the generator and battery(s) are installed in accordance with the present invention, a short distance in from the rear of the camper van, to gain access for service. Applicant has never seen a generator installed below the floor of a camper van, with or without a service door. Generators have, however, been installed in below floor level compartments, side or rear, of the larger straight-walled RV's, but all of these have service doors and are vented through the sides, hence distracting from a neat exterior appearance. None are installed in the open air, without a service door and/or any venting facility in accordance with the present invention. The space under the floor, at the rear, in the corner opposite to the proposed water heater location, can also be used for an optional auxiliary rear air conditioner condenser unit extension, connected with tubes to the same automotive compressor located under the hood for the air-conditioner unit.

DESCRIPTION OF THE VIEWS OF DRAWINGS

Figure 2:
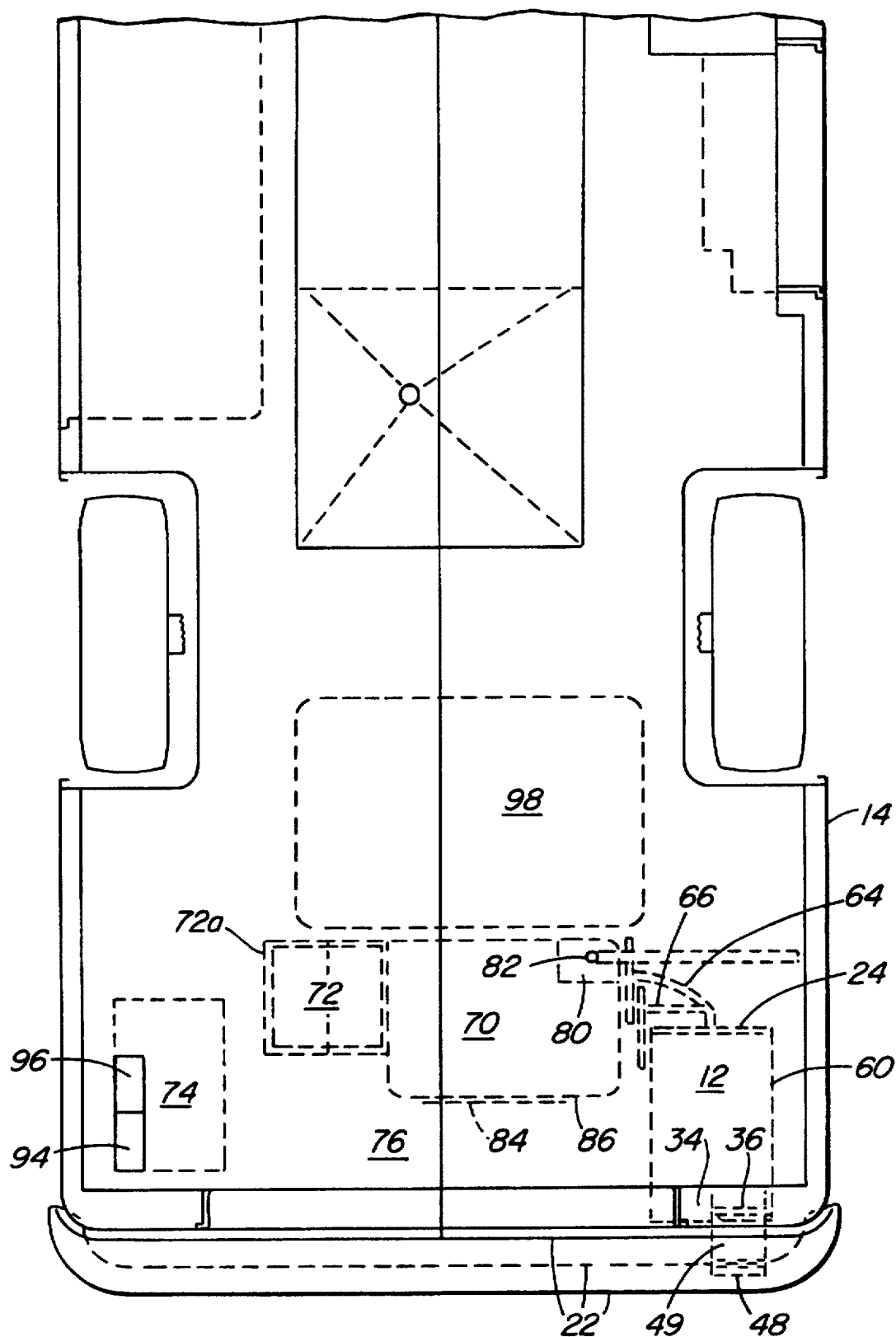
Figure 2A:
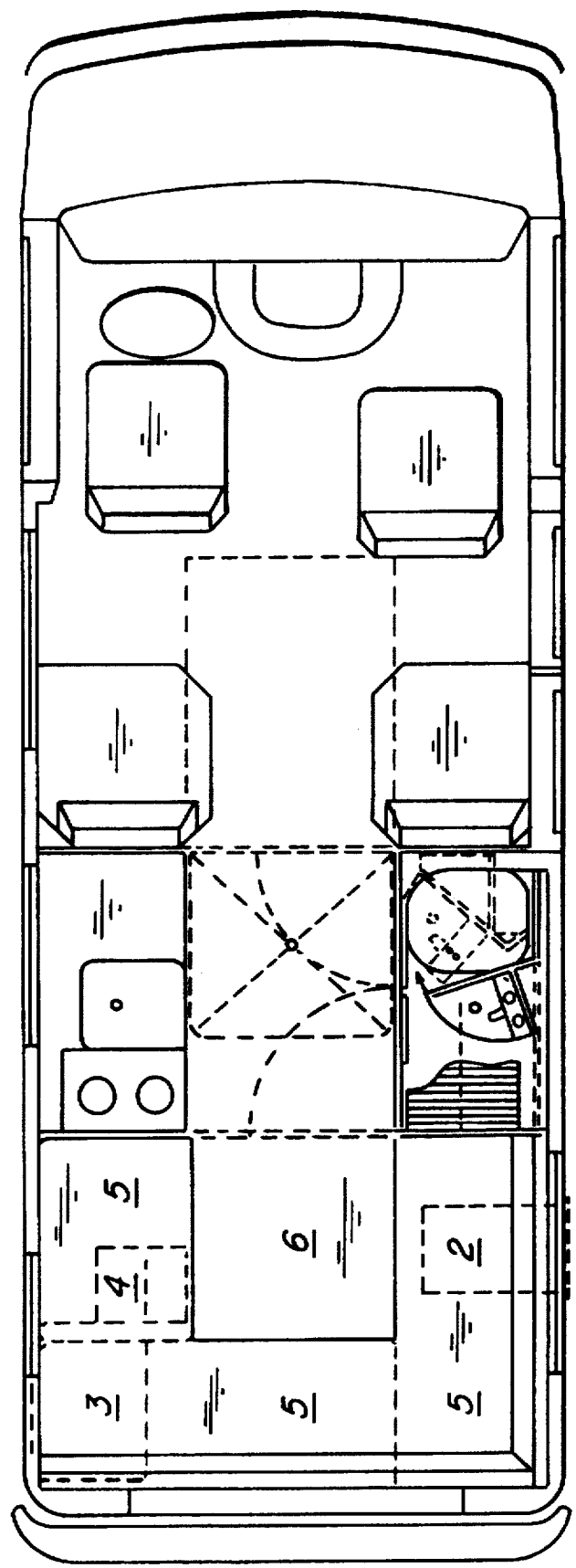

FIG. 2 is a top-plan view of the rear half of the camper van, showing the new location, in accordance with the invention, of the water heater generator, batteries and optional rear air conditioning unit below the floor, all in dashed lines, as well as the gasoline tank and the bottom edge of the rear bumper and also showing the space for service access between the generator/battery and the rear bumper;

FIG. 2A is a top-plan view of the interior layout of a camper van, showing the water heater, generator and batteries under the rear seating (convertible to bed), but above the floor; these are the current (prior art) locations;

FIG. 3 is an enlarged, rear-quarter view of the curb side of the camper van, taken along section lines 3—3 of FIG. 4, and with the hot air flow direction in the combustion chamber (which is deflected against the heat shield deflectors located at the rear end of the water heater tank and inside the bumper area, respectively) being indicated by arrows, all in dashed lines, the heater being in its suspended/retracted position against the floor of the van.

Figure 3A:
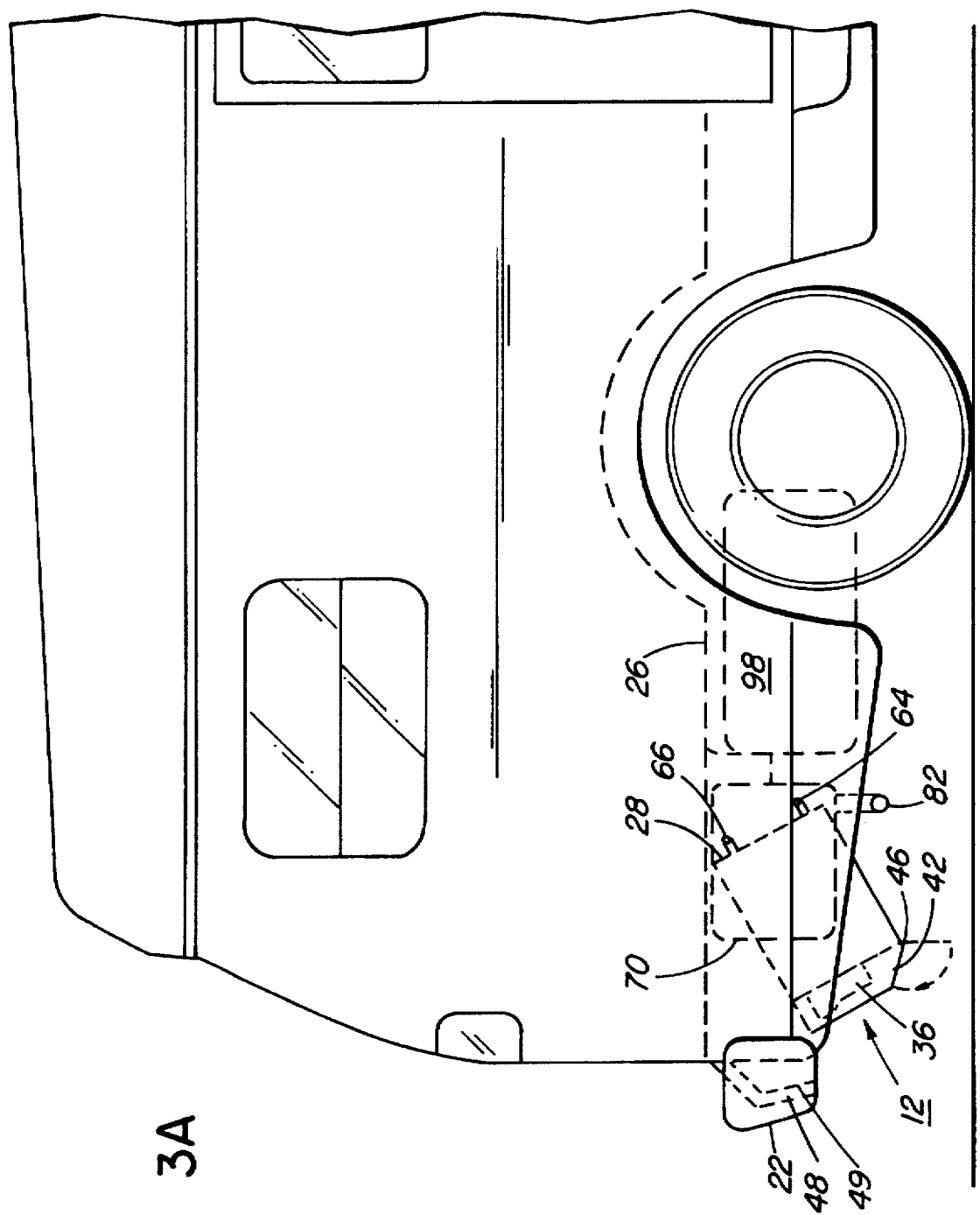

FIG. 3A is a rear-half side elevation view of the curb side of the camper van, except that the water heater is lowered at its rearward end to below the rear bumper, with the access door shown in the open position; the water heater detail (except for the outline of it below the van in solid lines) and the heat shield deflector inside the bumper area are shown in short dashed lines, while the generator, gasoline tank, crossbeam under the van floor, van floor and rear wheel well are indicated by longer dashed lines.

FIG. 4 is a rear end elevation view of a lower portion of the camper van and cut away to show the water heater in its raised position, the generator, batteries and optional auxiliary rear air conditioner unit, all suspended under the van floor; (the parts projecting below the bumper are above the view line of an adult, standing within a normal viewing distance from the vehicle and, therefore, don't detract from the neat appearance of the vehicle)

Figure 4A:
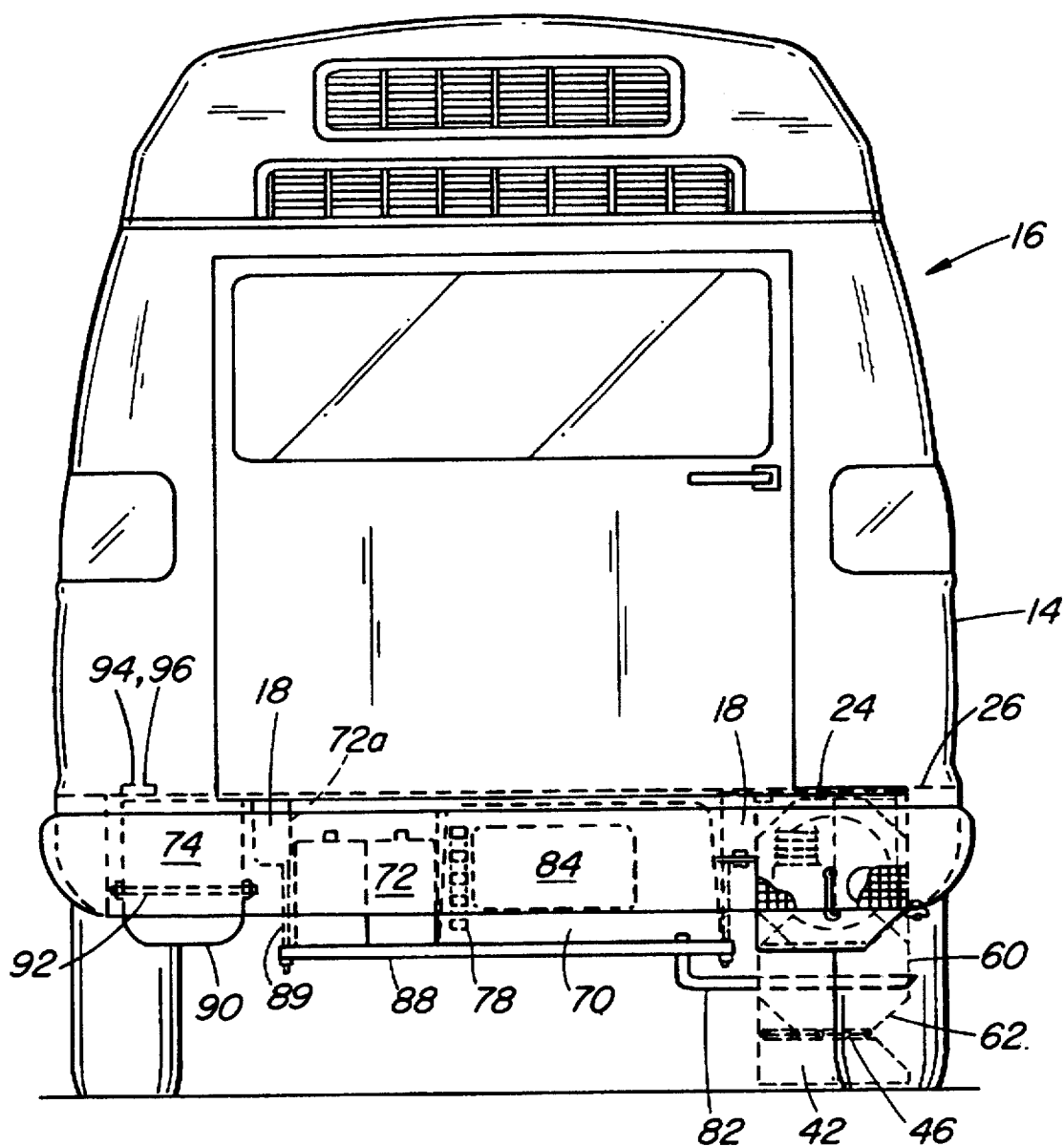
Figure 5:
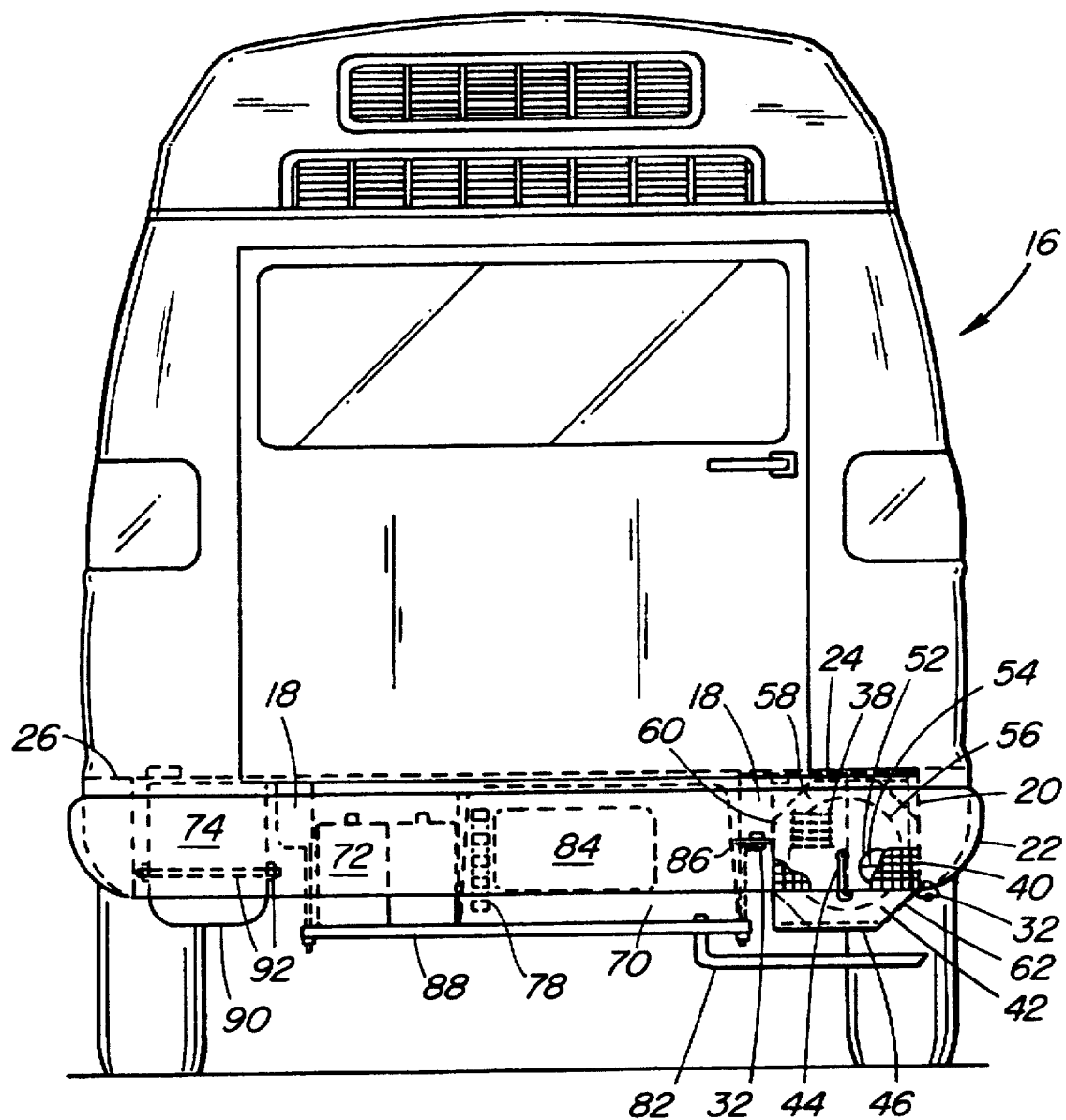

FIG. 4A is a rear-end elevation view of the camper van with the water heater being also shown by dashed lines, in its lowered position. The access door, partially covering the lower rear face of the water heater when closed, is seen open;

FIG. 5 is a rear-end elevation view of the camper van with the water heater being shown in the raised position.

DETAILED DESCRIPTION

Figure 1:
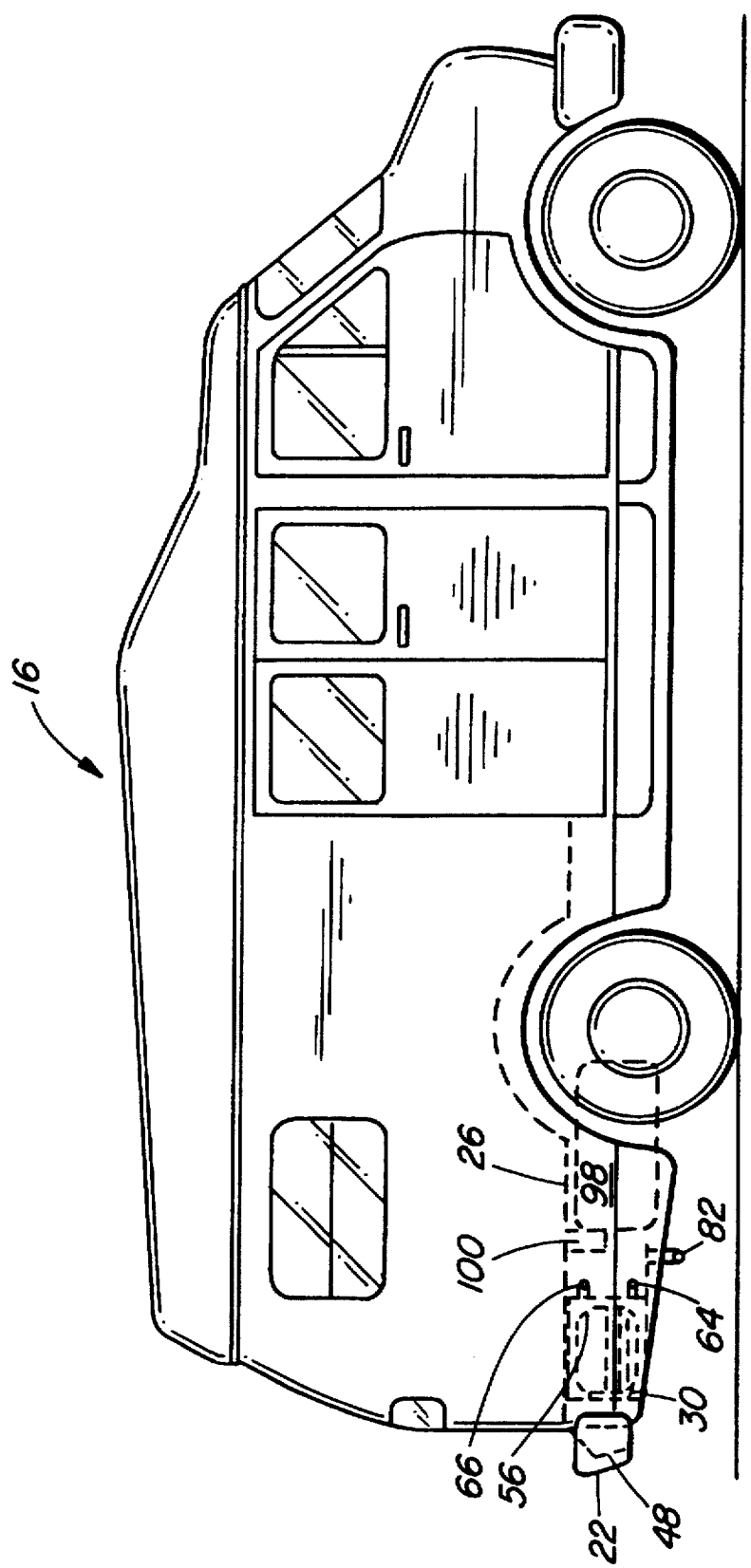
FIG. 1 is an elevation view of the curb side of a camper van showing, in accordance with the invention, the location of the water heater under the floor facing rearwardly, immediately forwardly of the rear bumper, the gasoline tank somewhat forwardly, and the floor and wheel well above them, all in dashed lines.
Figure 1A:
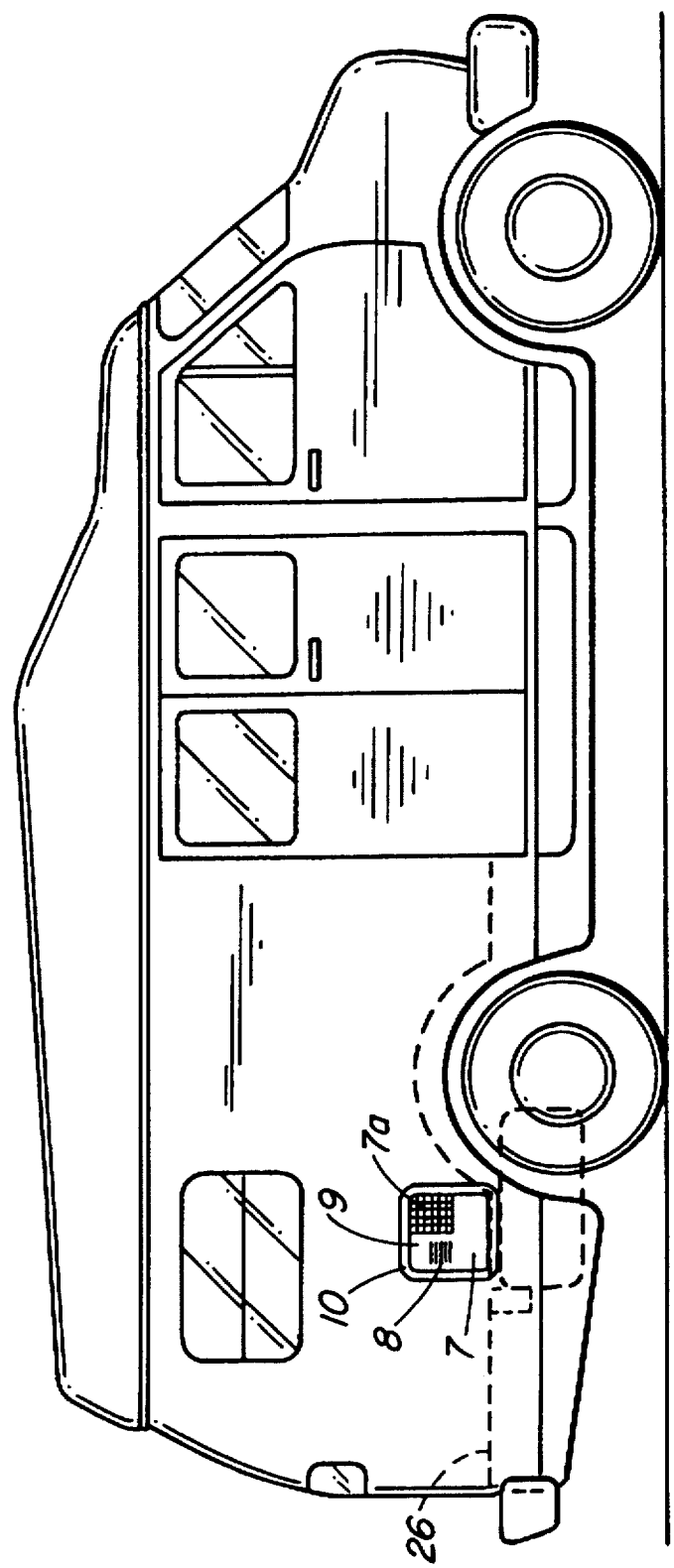
FIG. 1A is a view similar to FIG. 1, except that the water heater is located above the floor of the camper van and is facing to the curb side of the vehicle. This prior art location above the floor may vary depending on the model, but is always above the floor.

Referring firstly to a typical prior art configuration, an earlier "Roadtrek" camper van can be seen in FIG. 2A, in top-plan view lay-out with the water heater 2, generator 3 and battery(s) 4 all located above the van floor 26 (as in the prior art), but under the seat cushions 5, which convert to a bed when rearranged and by using the doubled-up backrest cushions 6. When located above the floor, the generator 3 and the batteries 4 must be in air tight, sealed and metal lined compartments, with ample venting for deadly fumes to escape directly to the outside via grilled or screened access doors or the like. The water heater 2 does not require a specially built, metal-lined, air-tight sealed compartment. Instead, the sealed enclosure of the water heater 2 must terminate directly at the exterior wall of the van body 16, as can be seen on FIG. 1A. The door 7 of this water heater 2 contains a venting grid of small holes 7a for the hot air to escape and a louvered grill 8 for fresh air to enter. This door 7 can be removed by turning a latch 9 and lifting the door 7 from two protruding pins at the bottom of the surrounding frame and flange 10 of the water heater 2 housing. These doors or removable panels are known to become lost, stolen or tampered with, including the apparatus. The locations above the van floor 26 for the foregoing equipment 2, 3 and 4, which are accessible by visible vented doors and/or panels and which are not allowed to be locked for safety regulations, are much more prone to tampering and much more unsightly than in the case where this equipment is located out of view, under the floor of the van, in accord with the present invention. When under the floor, there is no need for air-tight sealed, metal-lined compartments with vented doors, panels and/or grills, etc. and everything is out of sight for a neater exterior appearance.

Referring now to the remaining FIGS. 1, 2, 3, 3A, 4, 4A and 5, the new location of the water heater 12 is on the curb side 14, under the floor 26 of the van body 16, between the right chassis rail 18 and the so called rocker panel 20 (FIG. 4), facing towards the rear of the van body 16, and terminating even with the exterior of the van body 16, a short distance forwardly of the rear bumper 22. The water heater 12 is disposed within a box-like housing 34 which fully encloses water heater 12 except at its rear end as described hereafter. The water heater 12, of a standard commercially available design such as a LP gas "Suburban" (12,000 BTU), is hinged by hinge 24 connecting housing 34 to the van floor 26 at its forward end 28 and is held suspended by a metal strap 30 at the rearward end of the housing 34, which strap 30 is secured at its ends by bolts, with wing headed nuts 32 protruding from the bottom of the van body 16.

Housing 34 projects a short distance beyond the rearward end of the water heater 12 to define a space that contains the usual water heater operating apparatus and, among other things, a metal exhaust heat deflector shield 36. The rearward end of the housing 34 is covered by the exhaust heat deflector shield 36, air intake grill 38 and removable metal mesh 40 (both well known per se), and door 42 hinged by hinge 46 to the bottom rear edge of the water heater housing. When water heater 12 is lifted upwardly and secured in its raised position by strap 30, the door 42 is then held closed (up) by a hook 44 (FIG. 4).

A second exhaust heat deflector shield 48 having inturned flanges 49 at its opposed ends is located inside the rear bumper 22 and fixed thereto for directing the exhaust fumes which were deflected by shield 36 generally downwards as indicated by arrows 50 (FIG. 3). These fumes are created inside the combustion chamber 52 (located in the water heater tank 56) below a baffle 54 located in the center of the combustion chamber 52 in a horizontal position. The exhaust fumes are forced to reverse in direction back over the top of that baffle 54 and, after exiting chamber 52, to deflect against the exhaust heat deflector shield 36 located in the space at the rear end of housing 34, and these fumes then are deflected as noted above by the second exhaust heat deflector shield 48 located inside the bumper 22 to then dissipate in the outside air. This second exhaust heat deflector shield 48 is lined with a layer of fire-proof insulating material to protect the bumper 22 against excessive heat build-up.

As noted above, the combustion chamber 52 is inside the water heater tank 56 and surrounded by water for heating, except for the entrance at the rearward end. The water tank 56, as is well known, is surrounded by insulation 58 which is of octagon shape on the outside (FIG. 4). The insulation 58 is wrapped in a metal jacket 60 to provide protection and structural strength in well known fashion. The housing 34 which contains the water heater 12 is more or less square (box-like) in overall shape, except for the lower right corner 62 which is bevelled or angled to be more or less in line with the lower inwardly curved side of the van body 16 and with the view line of an adult standing a normal viewing distance away from the van body 16. The bottom of the housing 34 at the rearward end of the water heater 12 is also angled to be more or less in line with the curved bottom of the rear bumper 22 and with the view line of an adult when standing a normal viewing distance away from the van body 16 (see FIG. 3). Door 42 thus makes roughly a 45° angle with the bottom of housing 34 in the (up) closed door position (FIG. 3).

The cold and hot water lines, 64 and 66 respectively, and all other required connections to water heater 12 are of a flexible material to accommodate free movement when lowering and raising the water heater 12. Minor service and/or adjustment to the water heater 12 can also be made without lowering it, but by simply unhooking and opening of the door 42, thereby giving access to the facilities in the rear end of heater housing 34.

The generator 70, batteries 72 and auxiliary air conditioning unit 74 are easily accessible for service via the space 76 under the van floor 26, in the area just in front of the rear bumper 22. The cooling air for the generator drive motor enters the grill 78 in the rear wall of the generator enclosure, and exits through the opening 80 surrounding the generator drive motor exhaust pipe 82 (FIG. 2). The service door 84 (FIGS. 2, 4) for the generator 70 is also in the rear wall of its box-like enclosure 86. The batteries 72 are enclosed by panels on the sides, rear and bottom, to form a box-like enclosure 73, but they are exposed at the top half, facing to the rear, for venting and service, and are strapped down to the transverse support tubes 88 (which also support the generator 70), tubes 88 being suspended by vertical bolts 89 (FIG. 4A) secured to the chassis rails 18.

As can be seen in FIGS. 2, 4A and 5, there is sufficient space between the bumper and the generator/battery area for service access by reaching under the bumper, the generator and batteries being placed a sufficient distance forward to provide sufficient working area and, at the same time, far enough away so as not to be visible by an adult standing a normal viewing distance behind the van.

The auxiliary rear air conditioning unit 74 is suspended directly from the van floor 26. The bottom pan 90 of the auxiliary rear air conditioning unit is secured by a surrounding flange 92 bolted to the van floor 26 and readily removable for service by dropping it downwards. The cold air and warm air return ducts, 94 and 96 respectively, project through the van floor 26 and run to selected destinations.

The gasoline tank 98 is located just ahead of the generator 70 and the cross beam 100 which is secured under the van floor 26, between the chassis rails 18 (FIG. 3).

A preferred embodiment of the invention has been described and illustrated by way of example. Those skilled in the art will realize that various modifications and changes may be made while still remaining within the spirit and scope of the invention. Hence the invention is not to be limited to the embodiment as described but, rather, the invention encompasses the full range of equivalencies as defined by the appended claims.

I claim:

1. A Class B motor home comprising a commercial cargo van when converted to a recreational vehicle, said vehicle having a body including a floor and a rear bumper and a water heater having a burner therein suspended below said floor at the rear of said vehicle and forwardly of the rear bumper thereof, said water heater having a vent therein for releasing burner exhaust fumes rearwardly of the vehicle.

2. The motor home of claim 1 wherein said water heater is suspended at its frontal end by a hinge permitting the water heater to be swung downwardly away from said floor to provide for service access to the rearward end thereof.

3. The motor home of claim 2 including a releasable suspension means for supporting said rearward end of the water heater.

4. The motor home of claim 3 wherein the releasable suspension means comprises a strap having opposing ends releasably connected to points on the underside of the vehicle body.

5. The motor home of claim 2 wherein said water heater is enclosed in a housing, the rearward end of the housing having a door thereon permitting access to said burner.

6. The motor home of claim 5 wherein said water heater and housing are shaped and arranged so as to be substantially out of the view line of a person standing a normal viewing distance away from the vehicle.

7. The motor home of claim 1 wherein said rear bumper has an exhaust heat deflector shield on a forwardly facing surface thereof for receiving and deflecting exhaust fumes from said water heater and allowing dissipation of said fumes into the air while reducing heat build-up in said rear bumper.

8. The motor home of claim 1 further including a motor driven electrical generator suspended below said floor at the rear of said vehicle and spaced forwardly of the bumper thereof to permit service access thereto.

9. The motor home of claim 8 wherein said generator is disposed in a box-like enclosure having an air intake and exhaust openings therein.

10. The motor home of claim 8 further including one or more batteries suspended below said floor at the rear of said vehicle and spaced forwardly of the rear bumper thereof for service access thereto.

11. The motor home of claim 10 wherein said batteries are in a box-like enclosure partially open toward the rear of the vehicle for venting and service access.

12. A Class B motor home comprising a commercial cargo van when converted to a recreational vehicle, said vehicle having a body including a floor and a rear bumper and a motor driven electrical generator suspended below said floor at the rear of said vehicle and spaced forwardly of the bumper thereof to permit service access thereto.

13. The motor home of claim 12 wherein said generator is disposed in a box-like enclosure having an air intake and exhaust openings therein.

14. The motor home of claim 12 further including one or more batteries suspended below said floor at the rear of said vehicle and spaced forwardly of the rear bumper thereof for service access thereto.

15. The motor home of claim 14 wherein said batteries are in a box-like enclosure partially open toward the rear of the vehicle for venting and service access.

16. A motor home comprising a commercial cargo van when converted to a recreational vehicle, said vehicle having a body including a floor and a rear bumper and an air conditioner unit supported beneath the floor at the rear of said vehicle and having cool air and warm air ducts extending upwardly therefrom through said floor.

* * * * *

UNITED STATES PATENT AND TRADEMARK OFFICE
CERTIFICATE OF CORRECTION

PATENT NO. : 5,788,320
DATED : August 4, 1998
INVENTOR(S) : Jacobus N. Hanemaayer It is certified that error appears in the above-identified patent and that said Letters Patent is hereby corrected as shown below:

On the cover page insert the following:
--Related U.S. Application Data
[60] Provisional application No. 60/002,994 Aug. 30, 1995.--

On page 1, after the title, insert the following:
--CROSS REFERENCE TO RELATED APPLICATION
This application claims the benefit of U.S. Provisional Application No. 60/002,994, filed August 30, 1995.--

Signed and Sealed this

Twenty-third Day of February, 1999

Attest:

Q. TODD DICKINSON

*Attesting Officer*   *Acting Commissioner of Patents and Trademarks*